(12) United States Patent
Abe

(10) Patent No.: US 7,353,304 B2
(45) Date of Patent: Apr. 1, 2008

(54) PERIPHERAL DEVICE DRIVER INSTALLING DEVICE, PERIPHERAL DEVICE, SYSTEM AND METHOD FOR TRANSFERRING A DEVICE DRIVER TO THE PERIPHERAL BEFORE DISCONNECTING FROM AN INFORMATION PROCESSOR

(75) Inventor: Hideaki Abe, Saitama (JP)

(73) Assignee: Fuji Xerox Co., Ltd, Tokyo (JP)

( * ) Notice: Subject to any disclaimer, the term of this patent is extended or adjusted under 35 U.S.C. 154(b) by 471 days.

(21) Appl. No.: 10/939,487

(22) Filed: Sep. 14, 2004

(65) Prior Publication Data
US 2005/0210463 A1 Sep. 22, 2005

(30) Foreign Application Priority Data
Mar. 19, 2004 (JP) .............................. 2004-080473

(51) Int. Cl.
G06F 13/38 (2006.01)
G06F 3/00 (2006.01)
G06F 9/445 (2006.01)
G06F 13/00 (2006.01)

(52) U.S. Cl. ............................ 710/72; 717/176; 710/8; 719/321; 719/322; 719/327

(58) Field of Classification Search .................. 710/72; 719/321, 322, 323, 324, 325, 326, 327; 717/176
See application file for complete search history.

(56) References Cited

U.S. PATENT DOCUMENTS 6,718,463 B1* 4/2004 Malik ............................ 713/2

(Continued)

FOREIGN PATENT DOCUMENTS

JP 07-311663 A 11/1995

(Continued)

OTHER PUBLICATIONS

Microsoft Computer Dictionary, Fifth Edition, Microsoft Press, May 1, 2002.*

Primary Examiner—Henry Tsai
Assistant Examiner—Kris Rhu
(74) Attorney, Agent, or Firm—Oliff & Berridge, PLC

(57) ABSTRACT

A peripheral device driver installing device for installing a peripheral device driver peculiar to a peripheral device on an information processor which is connected to the peripheral device, comprising: a connection detecting unit for detecting a connection between the peripheral device and the information processor; a peripheral device inquiring unit for inquiring information concerning the peripheral device to the peripheral device; an installation determining unit for determining whether or not the peripheral device driver peculiar to the peripheral device has been installed on the information processor on the basis of the information concerning the peripheral device sent in response by the peripheral device to the peripheral device inquiring unit; a reading unit for reading a file of the peripheral device driver stored in the peripheral device if it is determined by the installation determining unit that the peripheral device driver has not been installed on the information processor; a storage unit for storing the file of the peripheral device driver read by the reading unit; a peripheral device driver installing unit for installing the peripheral device driver on the information processor on the basis of the file of the peripheral device driver stored in the storage unit; and a writing unit for writing the file of the peripheral device driver stored in the information processor on a storage unit provided in the peripheral device when the peripheral device and the information processor are disconnected.

15 Claims, 6 Drawing Sheets

U.S. PATENT DOCUMENTS

| | | |
|---|---|---|
| 6,732,195 B1 * | 5/2004 | Baldwin ........................ 710/6 |
| 6,957,437 B1 * | 10/2005 | Bogia et al. ................. 719/327 |
| 2004/0098714 A1 * | 5/2004 | Metz .......................... 717/168 |
| 2004/0128420 A1 * | 7/2004 | Su et al. ..................... 710/302 |
| 2005/0050339 A1 * | 3/2005 | Himmel et al. ............. 713/189 |
| 2005/0132352 A1 * | 6/2005 | Shen .......................... 717/174 |
| 2006/0173980 A1 * | 8/2006 | Kobayashi et al. ......... 709/222 |

FOREIGN PATENT DOCUMENTS

| JP | 2002-373144 A | 12/2002 |
|---|---|---|
| JP | 2003-150530 A | 5/2003 |

* cited by examiner

US 7,353,304 B2

PERIPHERAL DEVICE DRIVER INSTALLING DEVICE, PERIPHERAL DEVICE, SYSTEM AND METHOD FOR TRANSFERRING A DEVICE DRIVER TO THE PERIPHERAL BEFORE DISCONNECTING FROM AN INFORMATION PROCESSOR

BACKGROUND OF THE INVENTION

1. Field of the Invention

The present invention relates to a peripheral device driver installing device, a peripheral device, a peripheral device driver installing system, and a peripheral device driver installing method. More particularly, the present invention concerns a peripheral device driver installing device, a peripheral device, a peripheral device driver installing system, and a peripheral device driver installing method for providing a peripheral device driver to a connected PC.

2. Description of the Related Art

In peripheral devices such as a printer, a scanner, facsimile machine, a copying machine, and the like, in a case where a peripheral device driver conforming to a peripheral device locally connected to a personal computer (PC) has not been stored in a storage medium on the PC side, a user must newly install the peripheral device driver conforming to the peripheral device on the PC, which lacks operational efficiency. To solve this problem, proposals have been made for providing convenience in installing a peripheral device driver on the PC side by various means by mounting in advance peripheral device drivers on the peripheral device side (e.g., Japanese Patent Application Laid-Open No. 7-311663, Japanese Patent Application Laid-Open No. 2002-373144, and Japanese Patent Application Laid-Open No. 2003-150530).

However, according to the proposals in the aforementioned patent documents, although the user's convenience is ensured, a storage capacity necessary for the peripheral device drivers must be provided in the peripheral device, so that there has been a problem in that this constitutes a factor increasing the cost of the peripheral devices. Concerning this problem, in Japanese Patent Application Laid-Open No. 2003-150530, an attempt is made to overcome the problem of the storage capacity of the peripheral device by causing a peripheral device driver to simulate a printer subdevice (storage device) on the PC side and by cutting it off upon completion of the installation.

However, even if the subdevice is cut off, although the peripheral device driver to be stored ceases to be seen from the PC side, it does not follow that a storage area itself becomes unnecessary on the peripheral device side, so that the problem concerning the cost remains unsolved. In particular, in a case where a peripheral device is reconnected to another PC, a peripheral device driver in the storage device as the subdevice must be activated. It is thus apparent that the storage area for the peripheral device driver must be continuously held in the peripheral device.

In addition, there are plural kinds of operating system (OS) on the PC side, and plural peripheral device drivers corresponding to respective ones must be separately held in the peripheral device, so that the problem of the storage is a substantially major problem in Japanese Patent Application Laid-Open No. 7-311663 and the like.

According to the conventional art, if it is assumed that a minimum memory capacity capable of executing the basic operation of the peripheral device is 8 megabytes, in a case where the memory capacity occupied by the peripheral device driver is 2 megabytes, the usable memory becomes a remaining 6 megabytes according to the conventional art. Since the usable memory is less than that of the 8 megabytes required for the peripheral device to operate, the situation is such that an additional memory must inevitably be installed.

In addition, since a program of a peripheral device driver is normally used by being installed on the PC, there are cases where a function of a new peripheral device is provided to the user who is using it, or the correction of a bug of a program is executed on the PC. There is a possibility that such small-scale corrections of the program of the peripheral device driver are effected a number of times during a period of some years of use of the product. Such corrections are classified into corrections intended by the suppliers of the peripheral device drivers and corrections not intended by them. In the former case of intended corrections, the peripheral device drivers are frequently provided by suppliers as measures for guaranteeing functions and operation.

On the other hand, as for the latter case of unintended corrections, there are cases where changes not intended by suppliers are made due to incidental partial destruction of a file, computer virus contamination, or the like. If the peripheral device driver for which an unintended change has been made is rewritten on the peripheral device, its original functions and operation fail to perform as expected, and there is even a possibility of expanding the damage in the case of a virus contamination.

Furthermore, as for the peripheral device drivers in the present-day technology, multiple kinds of peripheral device drivers are required in correspondence with the types of OS of the PC, and the packaging of all of these peripheral device drivers in the peripheral device leads to higher cost.

SUMMARY OF THE INVENTION

Accordingly, an object of the present invention is to provide a peripheral device driver installing device, a peripheral device, a peripheral device driver installing system, and a peripheral device driver installing method, which make it possible to overcome the problem of the cost of a storage area occupied by peripheral device drivers of a peripheral device in which the peripheral device drivers are packaged in advance.

To achieve the above object, an aspect of the present invention provides a peripheral device driver installing device for installing a peripheral device driver peculiar to a peripheral device on an information processor which is connected to the peripheral device, comprising: a connection detecting unit for detecting a connection between the peripheral device and the information processor; a peripheral device inquiring unit for inquiring information concerning the peripheral device to the peripheral device; an installation determining unit for determining whether or not the peripheral device driver peculiar to the peripheral device has been installed on the information processor on the basis of the information concerning the peripheral device sent in response by the peripheral device to the peripheral device inquiring unit; a reading unit for reading a file of the peripheral device driver stored in the peripheral device if it is determined by the installation determining unit that the peripheral device driver has not been installed on the information processor; a storage unit for storing the file of the peripheral device driver read by the reading unit; a peripheral device driver installing unit for installing the peripheral device driver on the information processor on the basis of the file of the peripheral device driver stored in the storage unit; and a writing unit for writing the file of the peripheral device driver stored in the information processor on a storage unit provided in the peripheral device when the peripheral device and the information processor are to be disconnected.

Another aspect of the present invention provides a peripheral device for providing a service to an information processor, comprising: a storage unit for storing a file of a peripheral device driver for providing the service to the information processor; a connecting unit for connecting to the information processor; a transferring unit for transferring to the information processor the file of the peripheral device driver held in the storage unit when the peripheral device is connected to the information processor through the connecting unit; a peripheral device driver deleting unit for deleting the file of the peripheral device driver from the storage unit when a notification of completion of installation of the peripheral device driver is received from the information processor; and a writing unit for writing on the storage unit the file of the peripheral device driver transferred from the information processor when the peripheral device is disconnected from the information processor.

Still another aspect of the present invention provides a peripheral device driver installing system for installing a peripheral device driver peculiar to a peripheral device on an information processor which is connected to the peripheral device, wherein: the information processor comprises: a peripheral device connecting unit for connecting to the peripheral device; a connection detecting unit for detecting the connection between the peripheral device and the information processor; a peripheral device inquiring unit for inquiring information concerning the peripheral device to the peripheral device; an installation determining unit for determining whether or not the peripheral device driver peculiar to the peripheral device has been installed on the basis of the information concerning the peripheral device sent in response by the peripheral device to the peripheral device inquiring unit; a reading unit for reading a file of the peripheral device driver stored in the peripheral device if it is determined by the installation determining unit that the peripheral device driver has not been installed on the information processor; a first storage unit for storing the file of the peripheral device driver read by the reading unit; a peripheral device driver installing unit for installing the peripheral device driver on the basis of the file of the peripheral device driver stored in the first storage unit; an installation completion notifying unit for notifying completion of installation to the peripheral device when the installation of the peripheral device driver by the peripheral device driver installing unit has been completed; and a writing unit for writing the file of the peripheral device driver stored in the information processor in the peripheral device when the peripheral device and the information processor are to be disconnected, and the peripheral device comprises: a second storage unit for storing the file of the peripheral device driver; an information processor connecting unit for connecting to the information processor; and a peripheral device driver deleting unit for deleting the file of the peripheral device driver from the second storage unit when the notification of completion of installation of the peripheral device driver is received from the information processor.

Yet another aspect of the present invention provides a peripheral device driver installing method for installing a peripheral device driver peculiar to a peripheral device on an information processor which is connected to the peripheral device, comprising: inquiring, by the information processor, to the peripheral device information concerning the peripheral device when the peripheral device and the information processor are connected; sending, by the peripheral device, the information concerning the peripheral device to the information processor; determining, by the information processor, whether or not the peripheral device driver peculiar to the peripheral device has been installed on the basis of the information concerning the peripheral device; reading, by the information processor, a file of the peripheral device driver stored in the peripheral device if it is determined that the peripheral device driver has not been installed; storing, by the information processor, the file of the peripheral device driver which has been read; installing, by the information processor, the peripheral device driver on the basis of the file of the peripheral device driver stored; notifying, by the information processor, the completion of the installation to the peripheral device when the installation of the peripheral device driver has been completed; deleting, by the peripheral device, the file of the peripheral device driver upon receiving the notification of the completion of the installation; transferring, by the information processor, the file of the peripheral device driver stored in the information processor to the peripheral device when the peripheral device and the information processor are to be disconnected; and storing, by the peripheral device, the file of the peripheral device driver.

According to the present invention, an advantage is offered in that since the storage area occupied for the peripheral device driver on the peripheral device side can be freed, it becomes possible to contribute to the improvement of the basic performance of the peripheral device.

According to the present invention, another advantage is offered in that even in a case where the peripheral device is reconnected to another PC, it becomes possible to continue the convenience of the user.

According to the present invention, still another advantage is offered in that since it is possible to detect that a program for correcting a bug or the like which is present in the peripheral device driver has been applied, higher reliability can be maintained and developed.

According to the present invention, a further advantage is offered in that since it is possible to accurately determine whether the peripheral device driver has been contaminated with a virus or the like or the peripheral device driver is one for which a change intended by the supplier of the peripheral device has been made, it becomes possible to prevent the expansion of contamination with viruses or the like.

According to the present invention, a still further advantage is offered in that it becomes possible to detect or correct even slight deficiency of data, and to safely restore an important peripheral device driver program.

According to the present invention, a further advantage is offered in that it becomes possible to provide to a PC a peripheral device driver dependent on its OS with respect to various OS's.

BRIEF DESCRIPTION OF THE DRAWINGS

Embodiments of the present invention will be described in detail based on the following figures, wherein.

DETAILED DESCRIPTION OF THE INVENTION

Referring now to the accompanying drawings, a detailed description will be given of an embodiment of the present invention.

As an embodiment of the present invention, a detailed description will be given by citing as an example a configuration in which a personal computer (PC) and a printer, which is a peripheral device in accordance with the present invention, are connected, and a printer driver installing device, which is a peripheral driver installing device in accordance with the present invention, is incorporated in the PC (or externally connected thereto).

Figure 1:
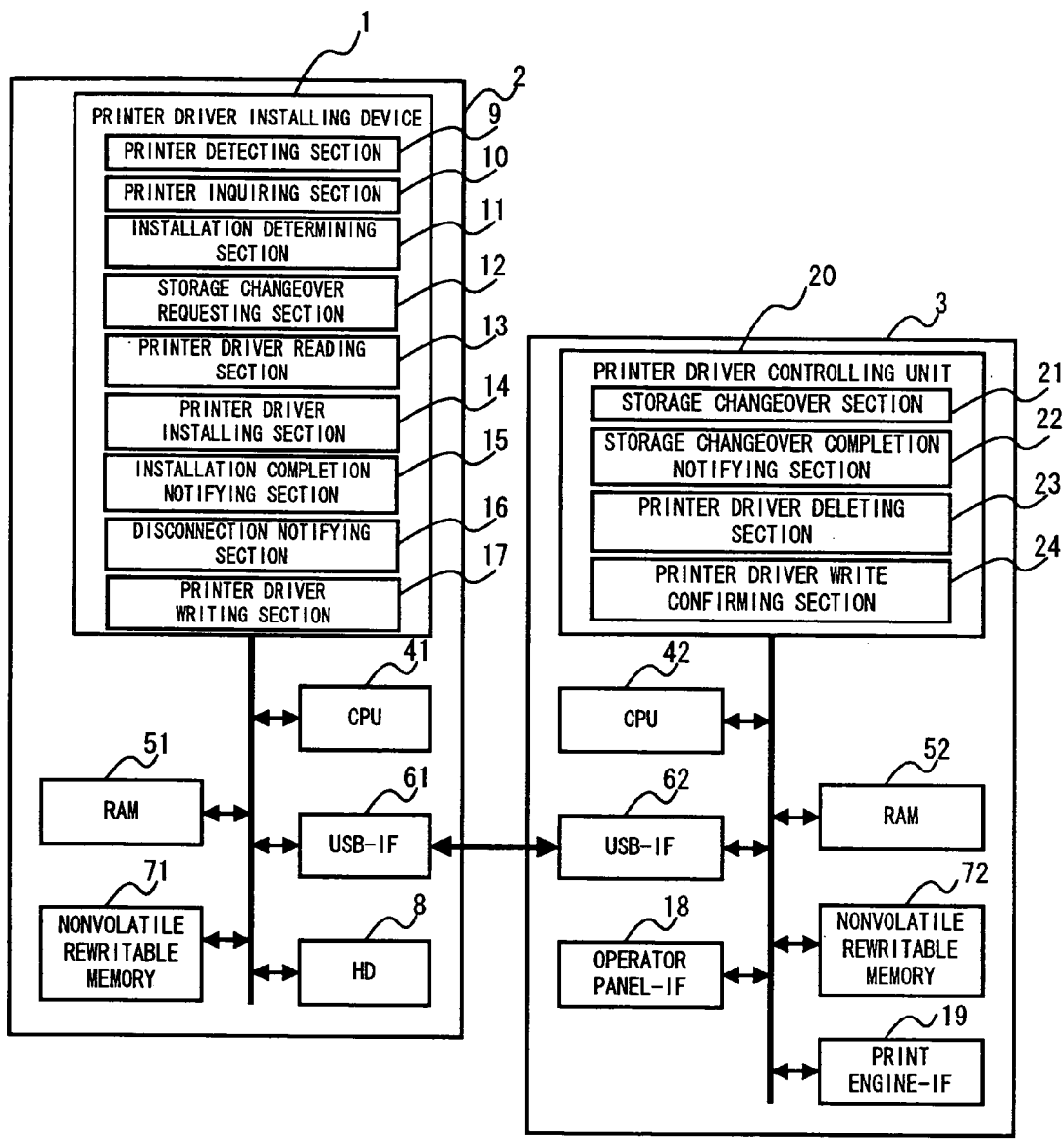
FIG. 1 is a block diagram illustrating an example of the configurations of a PC 2 with a printer driver installing device 1 incorporated therein and a printer 3.

FIG. 1 is a block diagram illustrating an example of the configurations of a PC 2 with a printer driver installing device 1 incorporated therein and a printer 3.

As shown in FIG. 1, the PC 2 and the printer 3 are locally connected.

The configuration of the PC 2 will be described in detail.

As shown in FIG. 1, the PC 2 includes a CPU 41, a RAM 51, a USB-IF 61, a nonvolatile rewritable memory 71, a HD 8, and the printer driver installing device 1.

The CPU (Central Processing Unit) 41 effects sequence control of the main unit of the PC on the basis of an operating system (OS) which is the system software.

The RAM (Random Access Memory) 51 is used as a buffer area of a work area necessary for the execution of a program.

The USB-IF 61 is an interface for connecting the PC 2 and the printer 3. However, a connection standard need not be limited to USB (Universal Serial Bus).

The nonvolatile rewritable memory 71 is a semiconductor memory which is capable of storing its stored contents even if a power supply is cut off.

When the PC 2 and the printer 3 are connected, the printer driver installing device effects the processing of reading a file of a printer driver from the connected printer 3, and when the PC 2 and the printer 3 are disconnected, the printer driver installing device effects the processing of transferring to the printer 3 the file of the printer driver stored in the PC 2.

It should be noted that the printer driver installing device in terms of its functions has a printer detecting section 9, a printer inquiring section 10, an installation determining section 11, a storage changeover requesting section 12, a printer driver reading section 13, a printer driver installing section 14, an installation completion notifying section 15, a disconnection notifying section 16, and a printer driver writing section 17.

Here, a detailed description will be given of the respective functions of the printer driver installing device.

The printer detecting section 9 detects the connection to the printer 3.

The printer inquiring section 10 effects the processing of inquiring a printer ID or the like to the printer 3 connected to the PC 2.

The installation determining section 11 effects the processing of determining whether or not a printer driver corresponding to the printer 3 has already been installed on the PC 2 on the basis of the printer ID or the like received from the printer 3.

The storage changeover requesting section 12 requests the printer 3 to change over a nonvolatile rewritable memory 72 of the printer 3 to a storage device for the PC 2.

The printer driver reading section 13 effects the processing of reading a file of the printer driver stored in the printer 3.

The printer driver installing section 14 effects the processing of installing the printer driver in the OS on the basis of the file of the printer driver read by the printer driver reading section 13.

Upon completion of the install processing of the printer driver by the printer driver installing section 14, the installation completion notifying section 15 effects the processing of notifying the printer that the install processing has been completed.

At the time of disconnecting the PC 2 and the printer 3, the disconnection notifying section 16 effects the processing of notifying the printer 3 that disconnection has been completed.

The printer driver writing section 17 effects the processing of writing the file of the printer driver on the nonvolatile rewritable memory 72 of the printer 3.

A detailed description will be given of the configuration of the printer 3.

As shown in FIG. 1, the printer 3 includes a CPU 42, a RAM 52, a USB-IF 62, a nonvolatile rewritable memory 72, an operator panel-IF 18, a print engine-IF 19, and a printer driver controlling unit 20.

The CPU 42 effects control of the main unit of the printer on the basis of printer control program firmware.

The RAM 52 is used as a buffer area of a work area necessary for the execution of the printer control program firmware.

The USB-IF 62 is an interface for connecting the PC 2 and the printer 3. However, a connection standard need not be limited to USB.

The nonvolatile rewritable memory 72 is a semiconductor memory which is capable of storing its stored contents even if the power supply is cut off. The nonvolatile rewritable memory 72 stores a printer driver peculiar to the printer 3, the printer control program firmware, and the like.

The operator panel-IF 18 is an interface with an operator panel that the printer 3 has.

The print engine-IF 19 is an interface with a print engine that the printer 3 has.

When the PC 2 and the printer 3 are connected, the printer driver controlling unit 20 effects the processing of providing the file of the printer driver to the connected PC 2 and of deleting the file of the printer driver after the provision. Further, when the PC 2 and the printer 3 are disconnected, the printer driver controlling unit 20 effects the processing of holding again the file of the printer driver stored in the PC 2.

The printer driver controlling unit 20 in terms of its functions has a storage changeover section 21, a storage changeover completion notifying section 22, a printer driver deleting section 23, and a printer driver write confirming section 24.

The storage changeover section 21 effects a changeover as to whether or not the nonvolatile rewritable memory 72 is to be used as a storage device for the PC 2.

Upon completion of the changeover by the storage changeover section 21 as to whether or not the nonvolatile rewritable memory 72 is to be used as a storage device for the PC 2, the storage changeover completion notifying section 22 effects the processing of notifying the PC 2 that the changeover has been completed.

After the file of the printer driver is provided to the connected PC 2, the printer driver deleting section 23 effects the deleting of the file of the printer driver stored in the nonvolatile rewritable memory 72.

When the PC 2 writes the printer driver on the nonvolatile rewritable memory 72, the printer driver write confirming section 24 confirms whether or not a change not intended by the supplier of that printer driver has been made.

Figure 2:
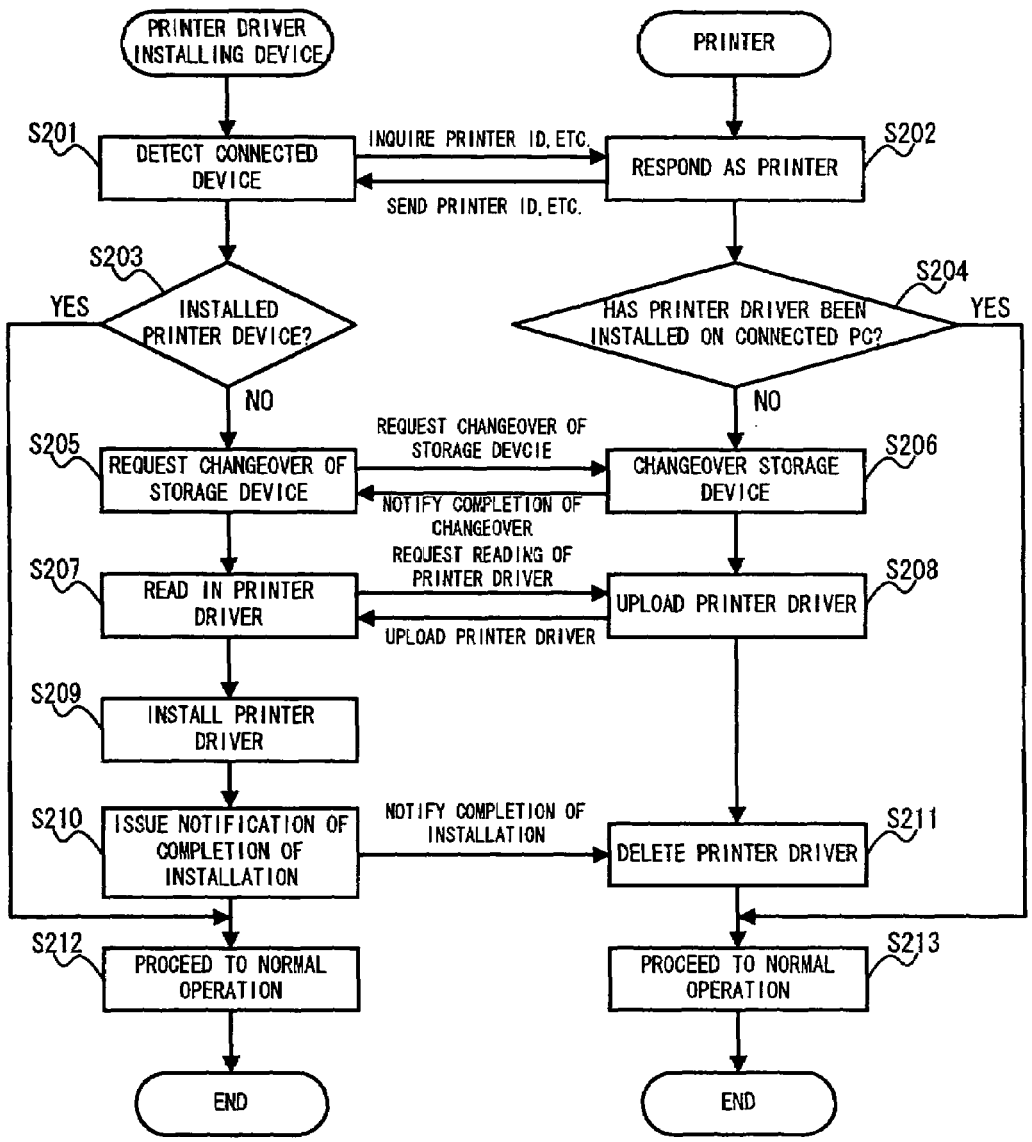
FIG. 2 is a flowchart illustrating the processing executed by the printer driver installing device and the printer.

Next, referring to the flowchart shown in FIG. 2, a description will be given of the processing effected by the printer driver installing device and the printer when the PC and the printer are connected.

If the PC and the printer are connected through their USB-IF's, the printer detecting section of the printer driver installing device detects the connection to the printer, and the printer inquiring section of the printer driver installing device inquires the printer ID or the like to the connected printer (Step S201).

In response to the inquiry on the printer ID or the like from the PC, the printer sends the printer ID or the like (Step S202).

When the printer driver installing device receives the printer ID from the printer, the installation determining section of the printer driver installing device determines the type of printer and the like on the basis of the printer ID, and determines whether or not the printer driver peculiar to that printer has already been installed on the PC (Step S203).

If the installation determining section of the printer driver installing device determines that the printer driver has already been installed on the PC (YES in Step S203 and YES in Step S204), the printer driver installing device and the printer terminates their operation.

On the other hand, if the installation determining section of the printer driver installing device determines that the printer driver has not been installed on the PC (NO in Step S203 and NO in Step S204), the storage changeover requesting section of the printer driver installing device requests the printer to changeover the nonvolatile rewritable memory of the printer to the storage device for the PC (hereafter, this request will be called the storage device changeover request) (Step S205).

When the printer receives the storage device changeover request from the PC, the storage changeover section of the printer changes over the nonvolatile rewritable memory to the storage device for the PC, and the storage changeover completion notifying section of the printer notifies the PC that the changeover of the storage device has been completed (Step S206).

When the printer driver installing device receives the notification from the printer that the changeover of the storage device has been completed, the printer driver reading section reads the printer driver from the printer (Step S207 and Step S208).

When the printer driver installing device reads the printer driver from the printer, the printer driver installing section of the printer driver installing device installs the printer driver on the PC (Step S209).

When the printer driver installing device completes the installation of the printer driver, the installation completion notifying section of the printer driver installing device notifies the printer that the installation has been completed (Step S210).

When the printer receives the notification of the completion of installation from the PC, the printer driver deleting section of the printer deletes the printer driver stored in the nonvolatile rewritable memory (Step S211).

Then, the printer driver installing device and the printer proceed to the normal operation (Step S212 and Step S213), and end the operation.

Figure 3:
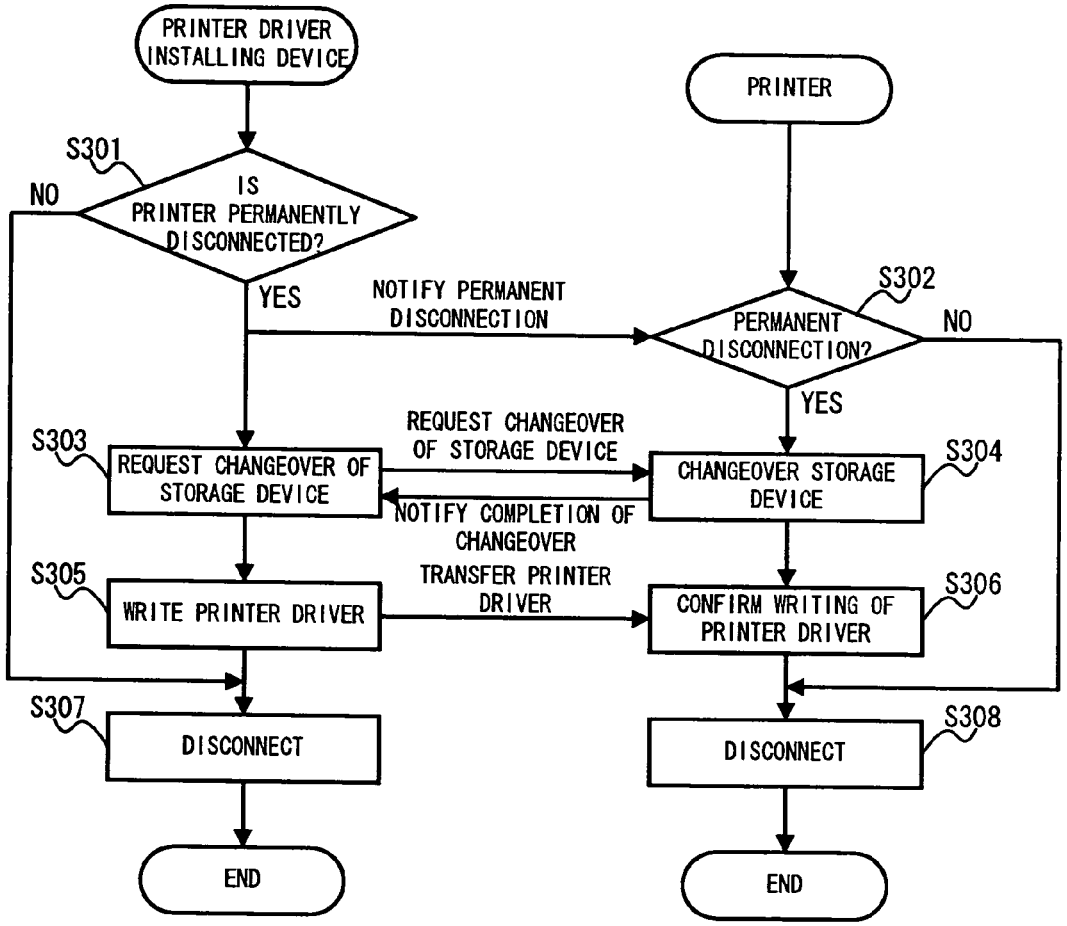
FIG. 3 is a flowchart illustrating the processing executed by the printer driver installing device and the printer when the PC and the printer are disconnected.

Next, referring to the flowchart shown in FIG. 3, a description will be given of the processing effected by the printer driver installing device and the printer when the PC and the printer are disconnected.

The disconnection notifying section of the printer driver installing device notifies a permanent disconnection to the printer (YES in Step S301 and YES in Step S302).

Here, in a case where it is not a permanent disconnection (NO in Step S301 and NO in Step S302), the printer driver installing device and the printer end the operation.

The storage changeover requesting section of the printer driver installing device requests the printer to changeover the nonvolatile rewritable memory of the printer to the storage device for the PC (hereafter, this request will be called the storage device changeover request) (Step S303).

When the printer receives the storage device changeover request from the PC, the storage changeover section of the printer changes over the nonvolatile rewritable memory to the storage device for the PC, and the storage changeover completion notifying section of the printer notifies the PC that the changeover of the storage device has been completed (Step S304).

When the printer driver installing device receives the notification from the printer that the changeover of the storage device has been completed, the printer driver writing section writes the printer driver on the nonvolatile rewritable memory of the printer (Step S305).

It should be noted that when the printer driver installing device writes the printer driver on the nonvolatile rewritable memory, the printer driver write confirming section of the printer confirms whether or not a change not intended by the supplier has been made in that printer driver, and if the change has not been made, the writing of the printer driver is allowed (Step S306).

Then, the printer driver installing device and the printer are disconnected (Step S307 and Step S308), and the processing ends.

Figure 4:
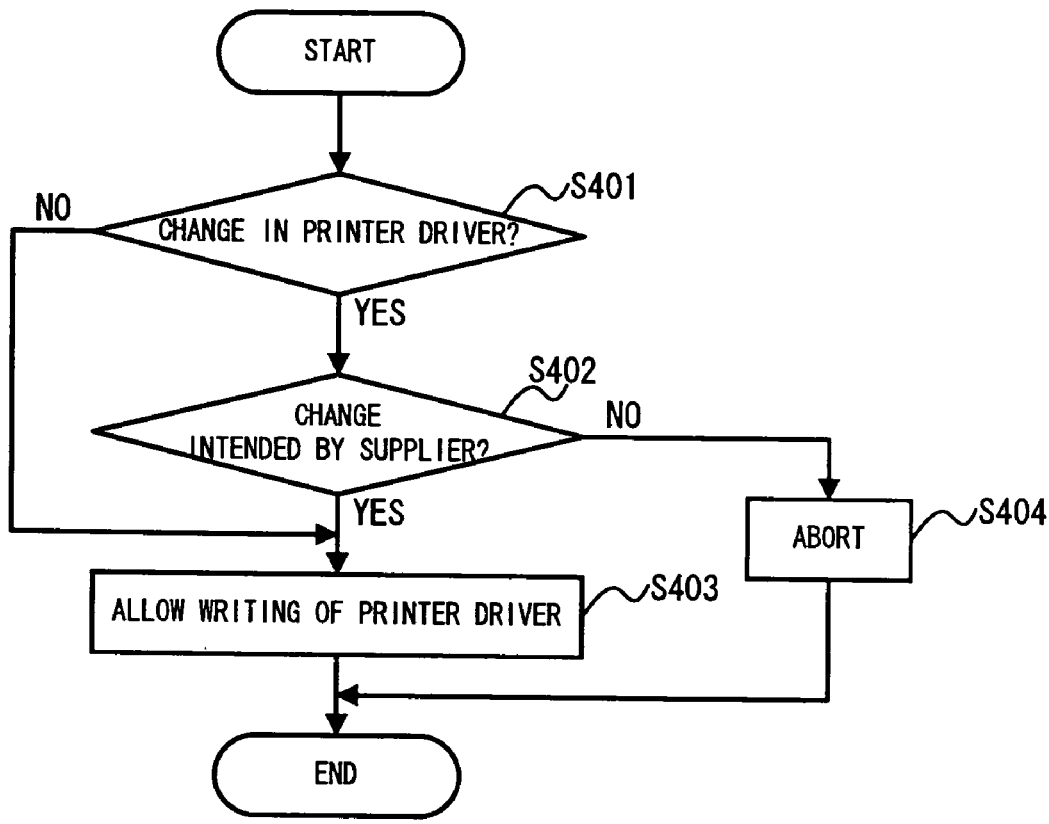
FIG. 4 is a flowchart illustrating the processing executed by a printer-driver write confirming section of the printer.

Next, referring to the flowchart shown in FIG. 4, a description will be given of the processing effected by the printer driver write confirming section of the printer.

A confirmation is made as to whether or not there has been a change in the printer driver which is written on the nonvolatile rewritable memory of the printer by the PC (Step S401).

If there has been no change in the printer driver (NO in Step S401), the operation proceeds to Step S403.

If there has been a change in the printer driver (YES in Step S401), a confirmation is made as to whether or not the change is one intended by the supplier (Step S402).

If the change is the one intended by the supplier (YES in Step S402), the writing of the printer driver is allowed (Step S403), and the processing ends.

If the change is not the one intended by the supplier (NO in Step S402), the processing is aborted (Step S404), and the processing ends.

It should be noted that it is unnecessary to limit the configuration to one in which the printer driver installing device directly reads or writes the printer driver with respect to the nonvolatile rewritable memory of the printer, and the present invention is also applicable to a configuration in which the printer driver controlling unit has a printer driver transferring section for transferring the printer driver to the printer driver installing device, as well as a printer driver writing section for writing the printer driver transferred from the printer driver installing device on the nonvolatile rewritable memory.

In addition, the present invention is also applicable to a configuration in which a small amount of redundant data is held in the peripheral device without causing the printer to hold the entire printer driver during connection to the PC, whereby if there has been a change in the refreshed printer driver, the originally deleted printer driver is generated from the refreshed printer driver and its difference.

Figure 5:
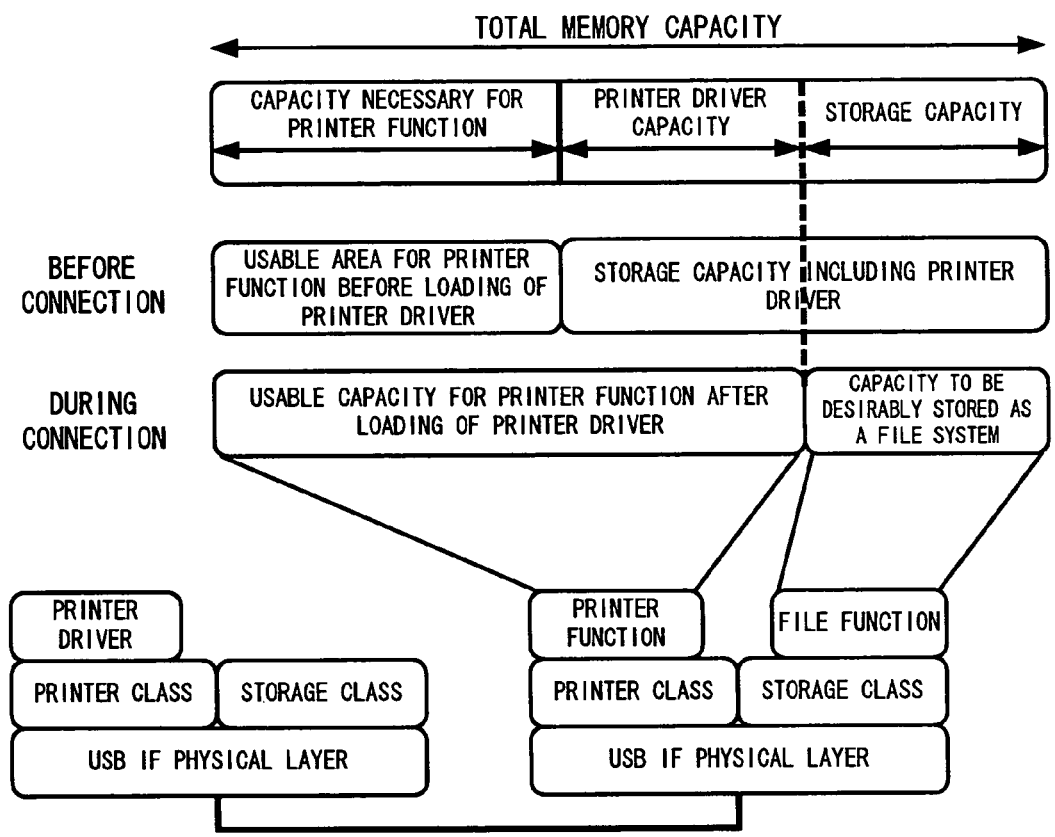
FIG. 5 is a diagram in which a comparison is made between the capacity of the memory in which the printer driver is stored and the capacity of the memory when the printer driver is deleted.

FIG. 5 is a diagram in which a comparison is made between the capacity of the memory in which the printer driver is stored and the capacity of the memory when the printer driver is deleted.

If a comparison is made between the usable capacity for the printer function in the state before the loading of the printer driver (i.e., the state before connection to the PC) and the usable capacity for the printer function in the state after the loading of the printer driver (i.e., the state of being connected to the PC), as shown in FIG. 5, the usable capacity for the printer function in the state after the loading of the printer driver is greater than the usable capacity for the printer function in the state before the loading of the printer driver. Namely, the portion of the capacity of the printer driver can be used as it is as the usable capacity for the printer function.

Accordingly, since the printer driver, the printer control program firmware, or the like is stored in the nonvolatile rewritable memory in the printer by being reversibly compressed, the execution of the program is impossible in the compressed state. However, after the printer driver has been transferred to the PC, and the printer driver in the nonvolatile rewritable memory is deleted, it becomes possible to decompress and expand the printer control program firmware in the printer driver storage area which became a space area, allowing the expanded printer control program to take over the control.

In addition, by making use of the feature of the nonvolatile rewritable memory, it becomes possible to hold information and the like set for each user. Specifically, practical applications are possible which make use of the advantage that form overly information, font information, print setting information, and the like are not cleared even by such as the turning off of the power supply.

In addition, the present invention need not be limited to the configuration in which the PC and the printer are connected through local ports of a connection standard such as USB, as described above, and the present invention is applicable to a configuration in which the PC and the printer are connected through a network.

Figure 6:
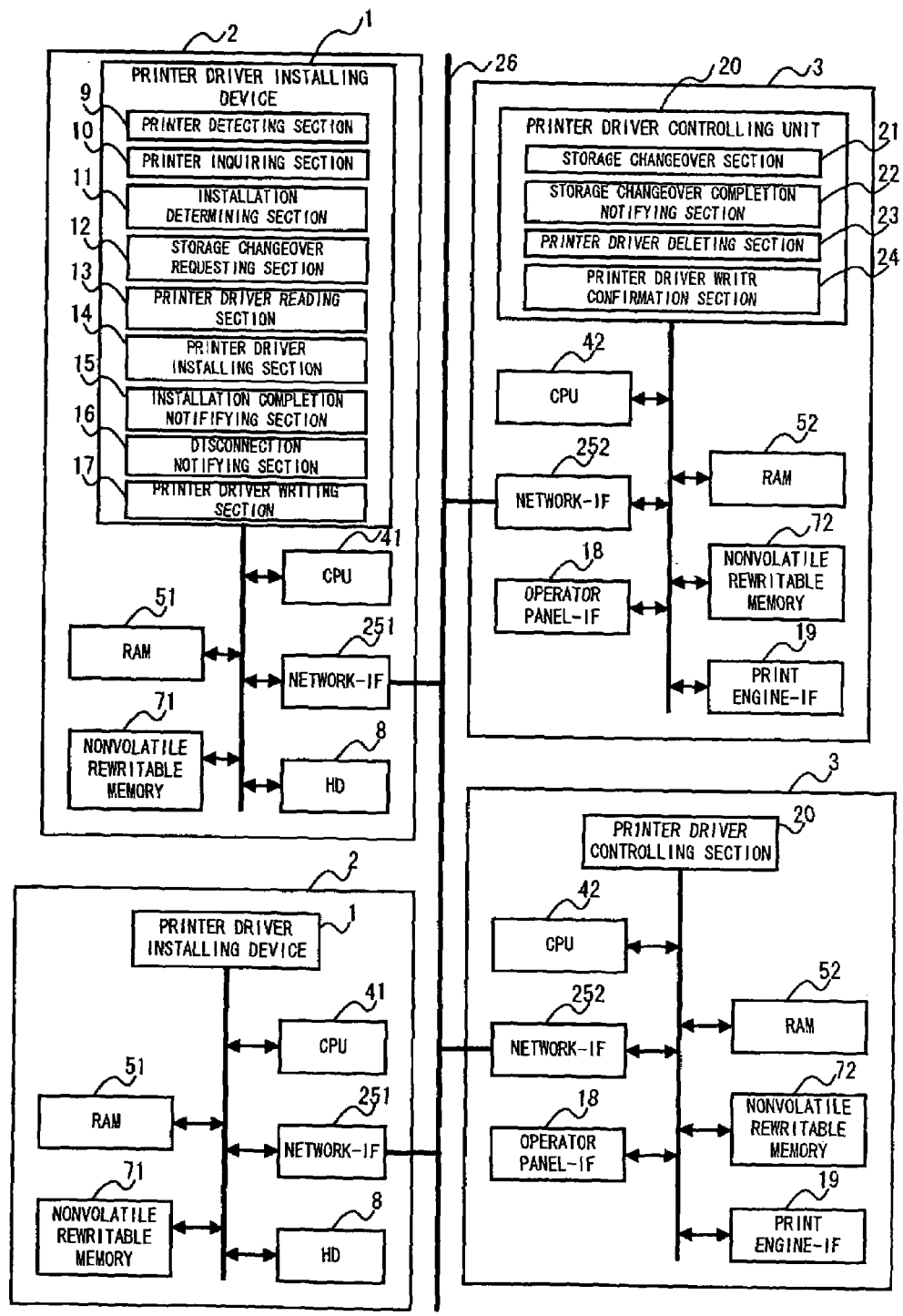
FIG. 6 is a diagram illustrating an example of the overall configuration of the PC incorporating (or externally connected to) the printer driver installing device which is the peripheral device driver installing device in accordance with the present invention, as well as the printer which is the peripheral device in accordance with the present invention, which are connected through a network.

FIG. 6 is a diagram illustrating an example of the overall configuration of the PC incorporating (or externally connected to) the printer driver installing device which is the peripheral device driver installing device in accordance with the present invention, as well as the printer which is the peripheral device in accordance with the present invention, which are connected through a network.

As shown in FIG. 6, plural printers 3 are connected to a network 26 through a NETWORK-IF 252, and plural PC's 2 using the printers 3 are connected to the network 26 through a NETWORK-IF 251. When the printer 3 is connected to the network 26 for the first time, the printer driver is transferred to the PC 2 through the network 26, and when the same printer 3 is added to the network 26, since the printer driver has already been installed on the PC 2, the installation operation is not perform. Therefore, it becomes possible to avoid wasteful installation operation.

In addition, when the printer 3 is disconnected from the network 26, it suffices if the printer driver is written on the printer 3 from the network-connected PC 2.

It should be noted that it is also possible to adopt a configuration in which the printer stores printer drivers respectively dependent on plural OS's, and when the printer is connected to the PC, all the printer drivers are transferred to the connected PC. At that time, it suffices if the PC installs only the printer driver dependent on its own OS, and the printer drivers dependent on the other OS's may not be installed and may only be stored. Further, at the time of disconnection from the printer, all the printer drivers may be written on the printer.

In addition, the present invention is also applicable to a configuration in which a program for installing a peripheral device driver is installed on all-purpose electronic computers including general PC's and the like as a program for installing a peripheral device driver which is capable of performing processing similar to that of the program for installing a peripheral device driver described in the foregoing embodiment.

What is claimed is:

1. A peripheral device driver installing device, set in an information processor connected to a peripheral device through a network, for installing a peripheral device driver for the peripheral device stored in a storage unit of the peripheral device on the information processor, comprising:

a connection detecting unit for detecting a connection between the peripheral device and the information processor;

a peripheral device inquiring unit for inquiring the peripheral device for information concerning the peripheral device when the connection detecting unit detected a connection to the peripheral device;

an installation determining unit for determining whether or not the peripheral device driver has been installed on the information processor on the basis of the information concerning the peripheral device sent from the peripheral device in response to the inquiring by the peripheral device inquiring unit;

a reading unit for reading a file of the peripheral device driver from the storage unit of the peripheral device if it is determined by the installation determining unit that the peripheral device driver has not been installed on the information processor;

a peripheral device driver installing unit for installing the peripheral device driver on the information processor on the basis of the file of the peripheral device driver read by the reading unit;

an installation completion notifying unit for notifying completion of installation to the peripheral device to delete the file of the peripheral device driver from the storage unit of the driver installing unit has been completed; and a file transferring unit for transferring the file of the peripheral device driver read by the reading unit to the peripheral device and writing the file of the peripheral device driver in the storage unit of the peripheral device when the peripheral device and the information processor are to be disconnected.

2. The peripheral device driver installing device according to claim 1, wherein the reading unit reads all files of peripheral device drivers for respective operating systems stored in the storage unit of the peripheral device, and the peripheral device driver installing unit installs the peripheral device driver dependent on the operating system held by the information processor on the information processor.

3. The peripheral device driver installing device according to claim 1, wherein in a case where a new peripheral device is connected to the network, if the installation determining unit determines that the peripheral device driver for a peripheral device which is identical to the new peripheral device has already been installed, the reading unit refuses to read a file of the new peripheral device driver stored in a storage unit of the new peripheral device.

4. A peripheral device, connected to an information processor through a network, for providing a service to the information processor, comprising:

a storage unit for storing a file of a peripheral device driver for providing the service to the information processor;

a connecting unit for connecting the peripheral device to the information processor;

a transferring unit for transferring to the information processor the file of the peripheral device driver stored in the storage unit when the peripheral device is connected to the information processor through the connecting unit;

a peripheral device driver deleting unit for deleting the file of the peripheral device driver from the storage unit when a notification of completion of installation of the peripheral device driver is received from the information processor; and a writing unit for writing on the storage unit the file of the peripheral device driver transferred from the information processor when the peripheral device is to be disconnected from the information processor.

5. The peripheral device according to claim 4, further comprising:

a confirming unit for confirming whether or not there has been a change in the peripheral device driver, when the writing unit writes on the storage unit the file of the peripheral device driver, wherein the writing unit refuses to effect the writing of the peripheral device driver on the storage unit if the confirming unit confirms that there has been a change in the peripheral device driver.

6. The peripheral device according to claim 4, wherein the storage unit stores all files of peripheral device drivers for respective operating systems, and the transferring unit transfers to the information processor all the files of the peripheral device drivers stored in the storage unit when the peripheral device is connected to the information processor.

7. The peripheral device according to claim 4, wherein the connecting unit connects the peripheral device to plural information processors on the network.

8. A peripheral device driver installing system for installing a peripheral device driver for a peripheral device stored in the peripheral device on an information processor which is connected to the peripheral device, wherein:

the information processor comprises:

a connection detecting unit for detecting a connection between the peripheral device and the information processor;

a peripheral device inquiring unit for inquiring the peripheral device for information concerning the peripheral device when the connection detecting unit detected the connection to the peripheral device;

an installation determining unit for determining whether or not the peripheral device driver has been installed on the information processor on the basis of the information concerning the peripheral device sent from the peripheral device in response to the inquiring by the peripheral device inquiring unit;

a reading unit for reading a file of the peripheral device driver stored in the peripheral device if it is determined by the installation determining unit that the peripheral device driver has not been installed on the information processor;

a peripheral device driver installing unit for installing the peripheral device driver on the information processor on the basis of the file of the peripheral device driver read by the reading unit;

an installation completion notifying unit for notifying completion of installation to the peripheral device when the installation of the peripheral device driver by the peripheral device driver installing unit has been completed; and a file transferring unit for transferring the file of the peripheral device driver read by the reading unit to the peripheral device when the peripheral device and the information processor are to be disconnected, and a storage unit for storing the file of the peripheral device driver for providing a service to the information processor;

a sending unit for sending to the information processor information concerning the peripheral device in response to the inquiring from the information processor by the peripheral device inquiring unit;

a deleting unit for deleting the file of the peripheral device driver from the storage unit on the basis of the notification of completion of installation from the information processor by the installation completion notifying unit; and a writing unit for writing on the storage unit the file of the peripheral device driver transferred from the information processor by the transferring unit.

9. The peripheral device driver installing system according to claim 8, wherein the peripheral device further includes a confirming unit for confirming whether or not there has been a change in the peripheral device driver, when the writing unit writes the peripheral device driver on the storage unit, and the writing unit refuses to effect the writing of the peripheral device driver on the storage unit if the confirming unit confirms that there has been a change in the peripheral device driver.

10. The peripheral device driver installing system according to claim 8, wherein the storage unit stores all files of peripheral device drivers for respective operating systems, and the reading unit reads all the files of the peripheral device drivers for respective operating systems stored in the storage unit of the peripheral device, and the peripheral device driver installing unit installs on the information processor the peripheral device driver dependent on an operating system held by the information processor.

11. The peripheral device driver installing system according to claim 8, wherein in a case where a new peripheral device is connected to the network, if the installation determining unit determines that the peripheral device driver for the peripheral device which is identical to the new peripheral device has already been installed, the reading unit refuses the reading of the file of the new peripheral device driver stored in the new peripheral device.

12. A peripheral device driver installing method for installing a peripheral device driver for a peripheral device stored in the peripheral device on an information processor which is connected to the peripheral device through a network, the method comprising:

inquiring, by the information processor, the peripheral device information concerning the peripheral device when the peripheral device and the information processor are connected;

sending, by the peripheral device, the information concerning the peripheral device in response to the inquiring by the information processor;

determining, by the information processor, whether or not the peripheral device driver for the peripheral device has been installed on the basis of the in formation concerning the peripheral device sent from the peripheral device;

reading, by the information processor, a file of the peripheral device driver stored in a storage unit of the peripheral device if it is determined that the peripheral device driver has not been installed;

installing, by the information processor, the peripheral device driver on the basis of the file of the peripheral device driver thus read;

notifying, by the information processor, the completion of the installation to the peripheral device when the installation of the peripheral device driver has been completed;

deleting, by the peripheral device, the file of the peripheral device driver from the storage unit upon the peripheral device receiving the notification of the completion of the installation;

transferring, by the information processor, the file of the peripheral device driver to the peripheral device when the peripheral device and the information processor are to be disconnected; and storing, by the peripheral device, the file of the peripheral device driver transferred from the information processor in the storage unit.

13. The peripheral device driver installing method according to claim 12, wherein the information processor confirms whether or not there has been a change in the peripheral device driver, when the information processor transfers the peripheral device driver to the peripheral device, and the information processor refuses to effect the transfer of the peripheral device driver to the peripheral device if the peripheral device confirms that there has been a change in the peripheral device driver.

14. The peripheral device driver installing method according to claim 12, wherein the storage unit of the peripheral device stores all files of peripheral device drivers for respective operating systems, the information processor reads all the files of the peripheral device drivers for respective operating systems stored in the storage unit of the peripheral device, and the information processor installs the peripheral device driver dependent on the operating system held by the information processor.

15. The peripheral device driver installing method according to claim 12, wherein in a case where a new peripheral device is connected to the network and the information processor determines on the basis of the inquiring that the peripheral device driver for the peripheral device which is identical to the new peripheral device has already been installed, the information processor refuses to read the file of the driver of the new peripheral device stored in the storage unit of the new peripheral device.

* * * * *